United States Patent
Yamaji et al.

(10) Patent No.: US 8,814,255 B2
(45) Date of Patent: Aug. 26, 2014

(54) VEHICLE FLOOR STRUCTURE

(71) Applicant: Teijin Limited, Osaka (JP)

(72) Inventors: Tadashi Yamaji, Matsuyama (JP); Koji Suzuki, Matsuyama (JP); Yutaka Yagi, Matsuyama (JP); Masatomo Teshima, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 13/957,752

(22) Filed: Aug. 2, 2013

(65) Prior Publication Data
US 2013/0313860 A1 Nov. 28, 2013

Related U.S. Application Data

(63) Continuation of application No. PCT/JP2012/051564, filed on Jan. 25, 2012.

(30) Foreign Application Priority Data

Feb. 3, 2011 (JP) ................................. 2011-021649

(51) Int. Cl.
*B60J 7/00* (2006.01)
*B62D 25/20* (2006.01)
*B62D 29/04* (2006.01)

(52) U.S. Cl.
CPC .............. *B62D 25/20* (2013.01); *B62D 29/043* (2013.01); *B62D 29/048* (2013.01)
USPC .................................................... 296/193.07

(58) Field of Classification Search
USPC ............. 296/193.07, 187.02, 187.08, 187.09, 296/187.12, 203.01, 203.02, 203.04, 204, 296/209, 37.2; 180/68.5
See application file for complete search history.

(56) References Cited

U.S. PATENT DOCUMENTS 3,638,748 A * 2/1972 Tixier ........................... 180/232
5,060,975 A 10/1991 Sano et al.
5,150,944 A 9/1992 Yoshida et al.
(Continued)

FOREIGN PATENT DOCUMENTS

JP H01-119480 A 5/1989
JP 02-098078 8/1990
(Continued)

OTHER PUBLICATIONS

International Search Report issued in corresponding International Application No. PCT/JP2012/051564 mailed Apr. 24, 2012.
(Continued)

*Primary Examiner* — Kiran B Patel
(74) *Attorney, Agent, or Firm* — Banner & Witcoff, Ltd.

(57) ABSTRACT

A vehicle floor structure, in which a main structure of the vehicle floor structure is a double deck structure including two sheets of panels formed from a fiber-reinforced thermoplastic composite material; in a region including the double deck structure, each of the panels includes at least two continuous reinforcing structures having a convex open cross-sectional shape; recesses are provided in at least two places of the reinforcing structures; and the panels are joined in such a manner that the reinforcing structures of the respective panels intersect with each other, and that the recesses provided in the reinforcing structures of the respective panels are fitted to each other.

11 Claims, 15 Drawing Sheets

(56) References Cited

U.S. PATENT DOCUMENTS

| | | | |
|---|---|---|---|
| 5,195,779 A | 3/1993 | Aoyama et al. | |
| 5,534,364 A * | 7/1996 | Watanabe et al. | 429/61 |
| 6,073,991 A * | 6/2000 | Naert | 296/187.02 |
| 7,654,352 B2 * | 2/2010 | Takasaki et al. | 180/68.5 |
| 7,828,370 B2 * | 11/2010 | Ohi et al. | 296/187.08 |
| 8,393,427 B2 * | 3/2013 | Rawlinson | 180/68.5 |
| 8,561,743 B2 * | 10/2013 | Iwasa et al. | 180/68.5 |
| 2004/0062955 A1 * | 4/2004 | Kubota et al. | 429/9 |
| 2007/0182071 A1 | 8/2007 | Sekido et al. | |
| 2009/0102238 A1 * | 4/2009 | Gomi | 296/193.07 |
| 2009/0152034 A1 * | 6/2009 | Takasaki et al. | 180/68.5 |
| 2011/0266838 A1 * | 11/2011 | Leopold | 296/193.07 |
| 2011/0300426 A1 * | 12/2011 | Iwasa et al. | 429/99 |
| 2011/0300427 A1 * | 12/2011 | Iwasa et al. | 429/99 |
| 2012/0103714 A1 * | 5/2012 | Choi et al. | 180/68.5 |
| 2012/0175900 A1 * | 7/2012 | Rawlinson | 293/132 |
| 2012/0175916 A1 * | 7/2012 | Rawlinson et al. | 296/203.02 |
| 2013/0257105 A1 * | 10/2013 | Mildner et al. | 296/204 |
| 2013/0313862 A1 * | 11/2013 | Yamaji et al. | 296/203.01 |
| 2013/0313863 A1 * | 11/2013 | Yamaji et al. | 296/203.01 |
| 2013/0341969 A1 * | 12/2013 | Fujii et al. | 296/193.07 |
| 2014/0035308 A1 * | 2/2014 | Suzuki et al. | 296/30 |

FOREIGN PATENT DOCUMENTS

| | | |
|---|---|---|
| JP | H05-085179 | 4/1993 |
| JP | 2008-068720 A | 3/2008 |
| JP | 2009-166408 A | 7/2009 |
| JP | 2009-190696 A | 8/2009 |

OTHER PUBLICATIONS

Written Opinion issued in corresponding International Application No. PCT/JP2012/051564 mailed Apr. 24, 2012.

* cited by examiner

VEHICLE FLOOR STRUCTURE

This application is a continuation of International Application No. PCT/JP2012/051564 filed on Jan. 25, 2012, and claims priority from Japanese Patent Application No. 2011-021649, filed on Feb. 3, 2011, the entire disclosure of which are incorporated herein by reference.

TECHNICAL FIELD

The present invention relates to a vehicle floor structure formed from a fiber-reinforced thermoplastic composite material.

BACKGROUND ART

A structure combined by sheet metal processing and welding of steel is common as a vehicle floor structure. The floor structure has a greatly complicated shape in order to install a reinforcing structure for increasing rigidity of a vehicle body and a space for housing a fuel pipe and an exhaust pipe at the bottom of the vehicle.

On the other hand, an approach in which a carbon-fiber-reinforced composite material is applied to the vehicle floor structure has been made, since a reduction in vehicle weight is strongly desired in order to reduce an environmental burden of a vehicle in recent years. The floor structure of the carbon-fiber-reinforced composite material described above is significantly lighter than an existing vehicle floor structure of steel, but the floor structure of the carbon-fiber-reinforced composite material is formed using expensive carbon fiber fabric and using a hand lay-up or autoclave method, which are methods with low productivity, to follow the complicated shape of the existing steel floor structure. Accordingly, the spread thereof is extremely limited from the viewpoint of economic efficiency. Recently, an approach to improve productivity has been made using a resin transfer molding method (RTM method) or the like (refer to Patent Document 1), but it is hard to say that the technology can be applied to general vehicles, since a curing reaction time of a thermosetting resin used as a matrix is rate-limiting.

A fiber-reinforced thermoplastic composite material in which a thermoplastic resin is used as a matrix have been developed as means for improving productivity of the composite materials. It is possible to give a fiber-reinforced thermoplastic composite material a shape in a short tact time by stamping molding after the fiber-reinforced thermoplastic composite is plasticized by heating. The necessary pressure for the stamping is lower than stamping molding of steel, and thus integral molding is possible if the size is one such as a vehicle floor structure. It is also possible to give the fiber-reinforced thermoplastic composite materials a shape of a hollow structure or an overhang, but for this, a mold having a complicated mechanism is necessary. Therefore, a simple shape which can be molded in a normal male-female shape is preferable in order to increase productivity.

Moreover, as another approach for reducing the environmental burden of a vehicle, the current to switch from an internal combustion engine to an electric engine as a power source is accelerated. At this time, it is necessary to mount a battery as an energy source. Since energy density of the battery is low in comparison with gasoline or diesel, there is a disadvantage of increasing size and weight of the battery. On the other hand, a fuel pipe or an exhaust pipe specific to the internal combustion engine is unnecessary, and thus the shape of the vehicle floor structure is greatly simplified.

CITATION LIST

Patent Document
Patent Document 1: JP-A-2009-190696

SUMMARY OF INVENTION

Problem to be Solved by the Invention

An object of the invention is to provide a vehicle floor structure formed from a fiber-reinforced thermoplastic composite material with lightweight high rigidity and high productivity.

Means for Solving Problem

The inventors of the present invention have attained to the invention as a result of careful researches in order to solve the above described problems. According to the invention, there is provided a vehicle floor structure, in which a main structure of the vehicle floor structure is a double deck structure including two sheets of panels formed from a fiber-reinforced thermoplastic composite material, and, in which, in a region of the double deck structure, each of the panels includes at least two continuous reinforcing structures having a convex open cross-sectional shape, recesses are provided in at least two places of the reinforcing structures, and the panels are joined in such a manner that the reinforcing structures of the respective panels intersect with each other, and that the recesses provided in the reinforcing structures of the respective panels are fitted to each other.

Advantageous Effects of Invention

According to the invention, it is possible to realize a vehicle floor structure with lightweight high rigidity by fitting and joining two sheets of panels. In addition, it is possible to realize extremely high productivity by manufacturing each of the panels with simple stamping molding of a fiber-reinforced thermoplastic composite material.

DESCRIPTION OF EMBODIMENTS

Figure 1:
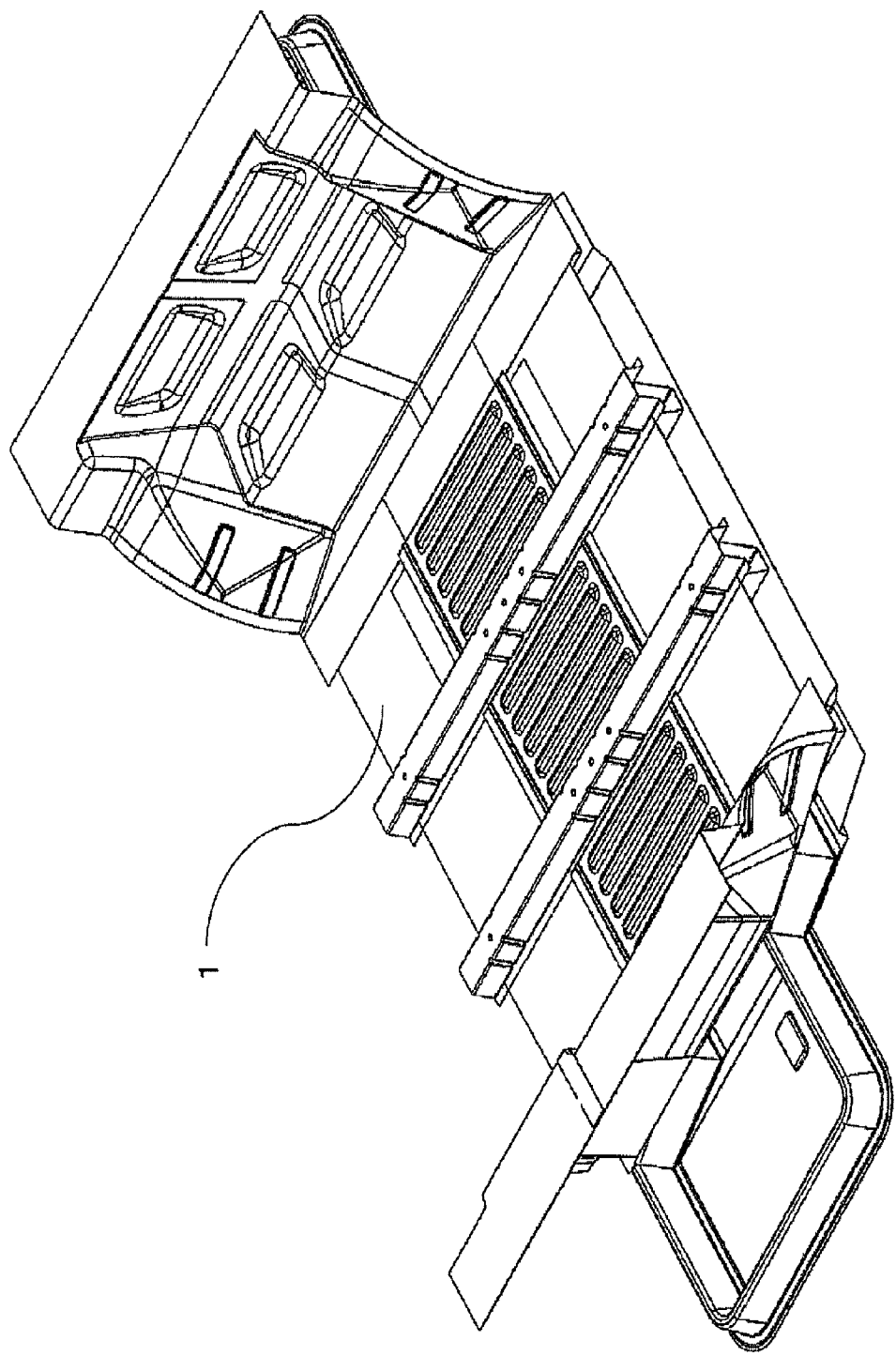
FIG. 1 is a perspective view illustrating an embodiment according to a vehicle floor structure of the invention.
Figure 2:
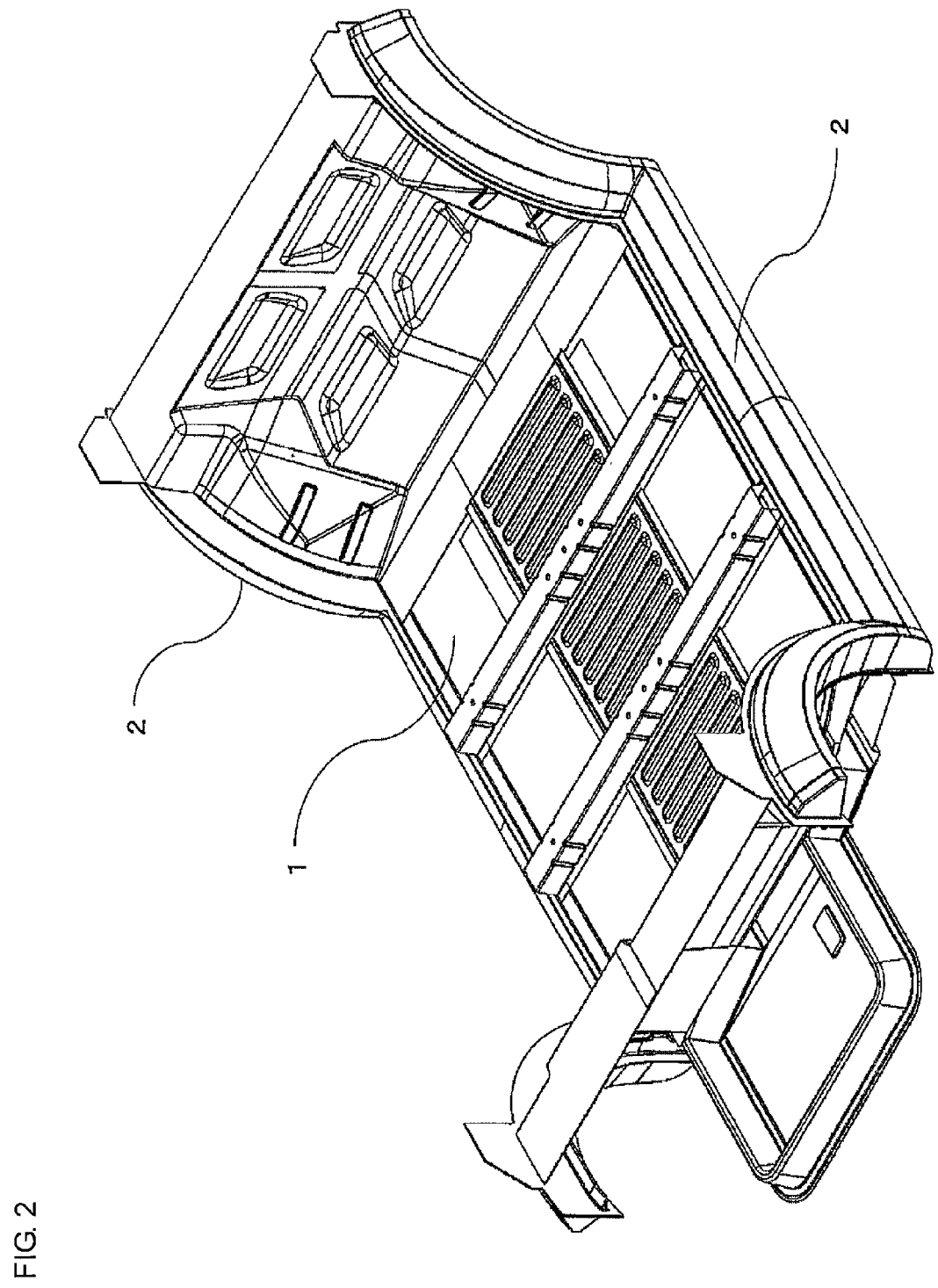
FIG. 2 is a perspective view illustrating a state in which side members are attached to the vehicle floor structure of the invention.
Figure 3:
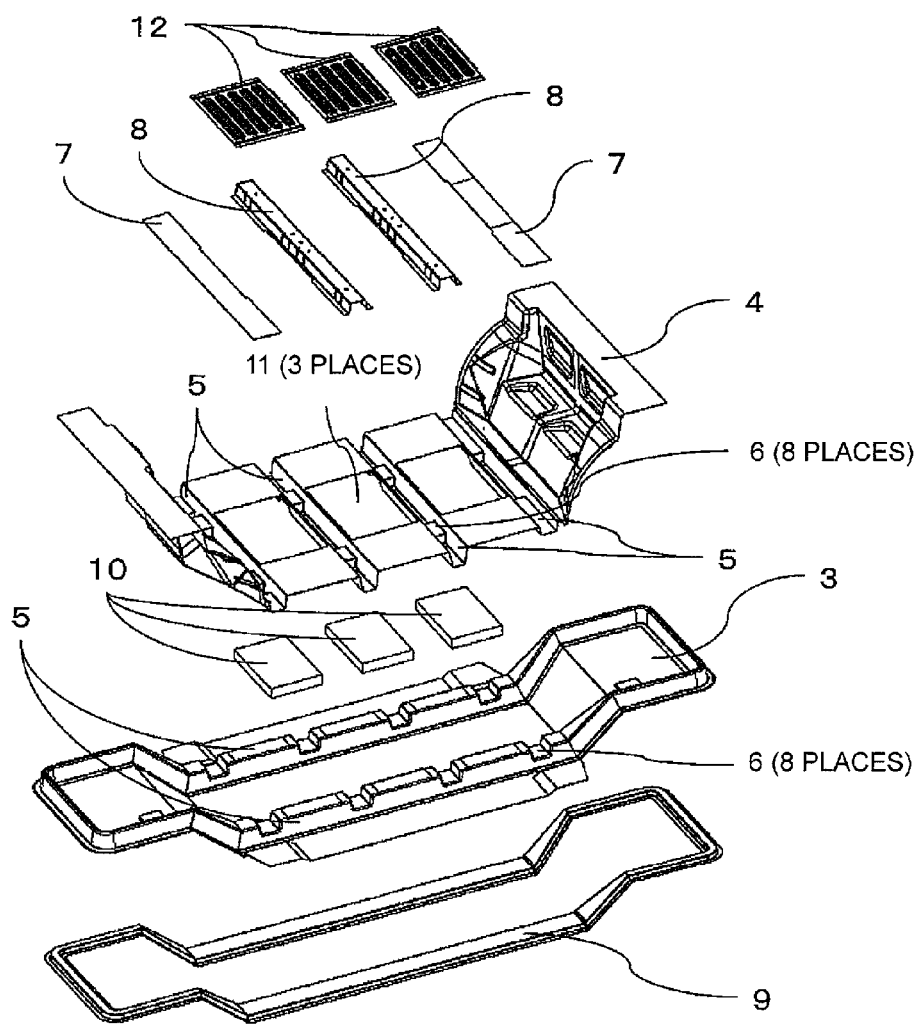
FIG. 3 is a perspective view illustrating a component configuration of the vehicle floor structure of the invention.
Figure 4:
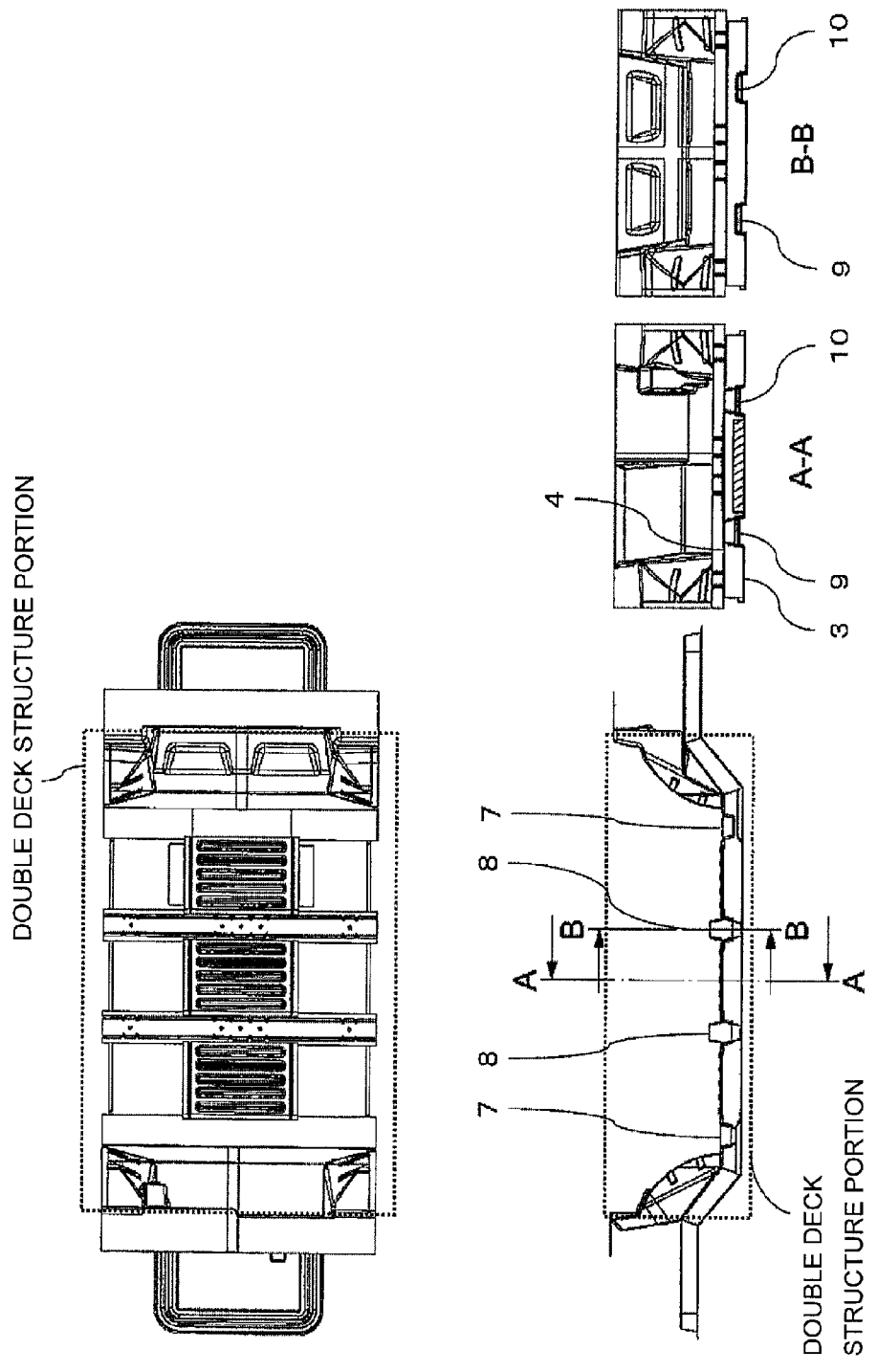
FIG. 4 is three orthographic views illustrating the embodiment according to the vehicle floor structure of the invention.

Hereinafter, a vehicle floor structure according to the invention will be described with reference to the drawings, but the invention is not limited thereto.

[Fiber-reinforced Composite Material]

A fiber-reinforced composite material in the vehicle floor structure according to the invention includes a reinforcing fiber and a matrix resin. The type of the reinforcing fiber in the fiber-reinforced composite material may be a short fiber, a long fiber, or a continuous fiber. It may be used in combination of at least two types of the fibers. The short fiber means a fiber having a fiber length of more than or equal to 0.1 mm and less than 10 mm, the long fiber means a fiber having a fiber length of more than or equal to 10 mm and less than or equal to 100 mm, and the continuous fiber is a fiber having a fiber length of more than or equal to 100 mm. In the case of the short fiber and the long fiber, they may form paper which is made using a chopped strand or the like. In the case of the continuous fiber, it is preferable that the continuous fiber is included in a matrix resin with a sheet-like shape such as a woven fabric, a sheet in which the strands are oriented in one direction, and a multi-axis woven fabric, or a non-woven fabric shape. In addition, the multi-axis woven fabric generally means a woven fabric in which a stacked body (multi-axis woven fabric base material) is made by: pulling and gathering bundles of fiber-reinforced materials in one direction to provide sheets and stacking the sheets at different angles; the stacked body is penetrated in the thickness direction with a stitch thread such as a nylon thread, a polyester thread, or a glass fiber thread, and the stacked body is stitched by going back and forth along a front side direction between a front side and a back side of the stacked body. Fiber-reinforced materials constituting the fiber-reinforced composite material body are preferably to be materials in which reinforcing fibers are randomly spread and oriented, reinforcing fibers are oriented to a specific fiber orientation, reinforcing fibers are plane-oriented, reinforcing fibers are oriented in one axis direction. They may be used as the combinations thereof, or the stacked body thereof. Above all, a fiber-reinforced composite material in the vehicle floor structure according to the invention is preferably to be a random fiber-reinforced composite material in which chopped fibers are randomly oriented in a thermoplastic resin as described below. Furthermore, a two-dimensional random fiber-reinforced composite material is more preferred, in which chopped fibers are two-dimensionally randomly oriented in a thermoplastic resin, since moldability thereof is extremely excellent and portions of recesses to be fitted when the panels are joined become particularly exquisite. A combination or a layer body of these random fiber-reinforced composite materials with other types of fiber-reinforced composite material can be suitably used in the vehicle floor structure according to the invention.

The fiber-reinforced composite material in the vehicle floor structure according to the invention may be a sandwich structure with a layer body of the fiber-reinforced composite material part and the part including only a resin. In the case of the sandwich structure, a core member is a composite material and a skin member may be a resin, but on the other hand, a core member is only a resin and a skin member may be a composite material.

[Matrix Resin]

A matrix resin used in the vehicle floor structure according to the invention is a thermoplastic resin or a composition thereof. Specifically, examples of the matrix resin may be a polycarbonate resin, a polyolefin resin, a polyester resin, an acrylic resin, a polylactic acid resin, a polyamide resin, an ASA resin, an ABS resin, a polyether ketone resin, a polyetherimide resin, a polyphenylene ether resin, a polyphenylene oxide resin, a polysulfone resin, a polyether sulfone resin, a polyetherimide resin, a polyether ether ketone resin, a polyphenylene sulfide resin, a polyamide-imide resin and mixtures (resin composition) of two types or more selected from these resins, but there is not a particular limitation thereto. The resin composition is preferably at least one type selected from groups consisting of a composition of the polycarbonate resin and the polyester resin, a composition of the polycarbonate resin and the ABS resin, a composition of the polyphenylene ether resin and the polyamide resin, a composition of the polyamide resin and the ABS resin, and a composition of the polyester resin and the polyamide resin or the like.

[Reinforcing Fiber]

As a reinforcing fiber used in the vehicle floor structure according to the invention, various fibers may be used depending on a use of a fastening structure, but examples thereof may be at least one type selected from groups consisting of a glass fiber, a polyester fiber, a polyolefin fiber, a carbon fiber, a para-based aramid fiber, a meta-based aramid fiber, a boron fiber, an azole fiber, and an alumina fiber or the like, and furthermore, the carbon fiber which is excellent in specific strength and specific elasticity is preferable in particular.

[Vehicle Floor Structure]

A vehicle floor structure according to the invention is provided in which a main structure of the vehicle floor structure is a double deck structure constituted by two sheets of panels formed from a fiber-reinforced thermoplastic composite material. The double deck structure according to the invention may include a structure of three layers or more having a local reinforcing member in a part thereof. The whole of the floor structure does not need to be the double deck structure, and two sheets of the panels may be joined for reinforcement in a part, and the respective panels may have a different form and function from each other in a part. It is preferable that the double deck structure becomes more than or equal to 50% in projection areas of the floor, and it is more preferable that the double deck structure becomes more than or equal to 70%. The thickness of the panel is not limited in particular, but preferably more than or equal to 0.5 mm and less than or equal to 10 mm, and further preferably more than or equal to 1 mm and less than or equal to 5 mm, from a well balance of strength, rigidity and lightweight properties. The thickness of the double deck structure is not particularly limited as well, but preferably more than or equal to 10 mm and less than or equal to 300 mm and further preferably more than or equal to 50 mm and less than or equal to 200 mm, from a well balance of rigidity and space securing in the vehicle. The thickness of the panel and the thickness of the double deck structure are not necessary to be constant in whole, and may be fluctuated locally.

[Panel]

Panels are formed from a fiber-reinforced thermoplastic composite material, and it is important that the panel includes at least two reinforcing structures which are continuous and which have a convex open cross-sectional shape. The reinforcing structures may be at least two in a region in which the floor structure includes the double deck structure. It may be one by combining two reinforcing structures with each other in a portion other than the region. The number of the reinforcing structures included in the respective panels may be the same, or may be different. The cross-sectional shape of the convex open cross-sectional shape may be selected from a hat-shape or a U-shape, but the hat-shape is most preferable. The height of the convex open cross-sectional shape is not limited in particular, but preferably more than or equal to 10 mm and less than or equal to 300 mm, and further preferably more than or equal to 50 mm and less than or equal to 200 mm. The width of the open cross-sectional shape is preferably more than or equal to 10 mm and less than or equal to 300 mm and further preferably more than or equal to 50 mm and less than or equal to 200 mm. Additionally, in the open cross-sectional shape, it is possible to add a draft angle optionally in a scope without spoiling the object of the invention from the viewpoint of performing press molding using the mold, for example.

Figure 5:
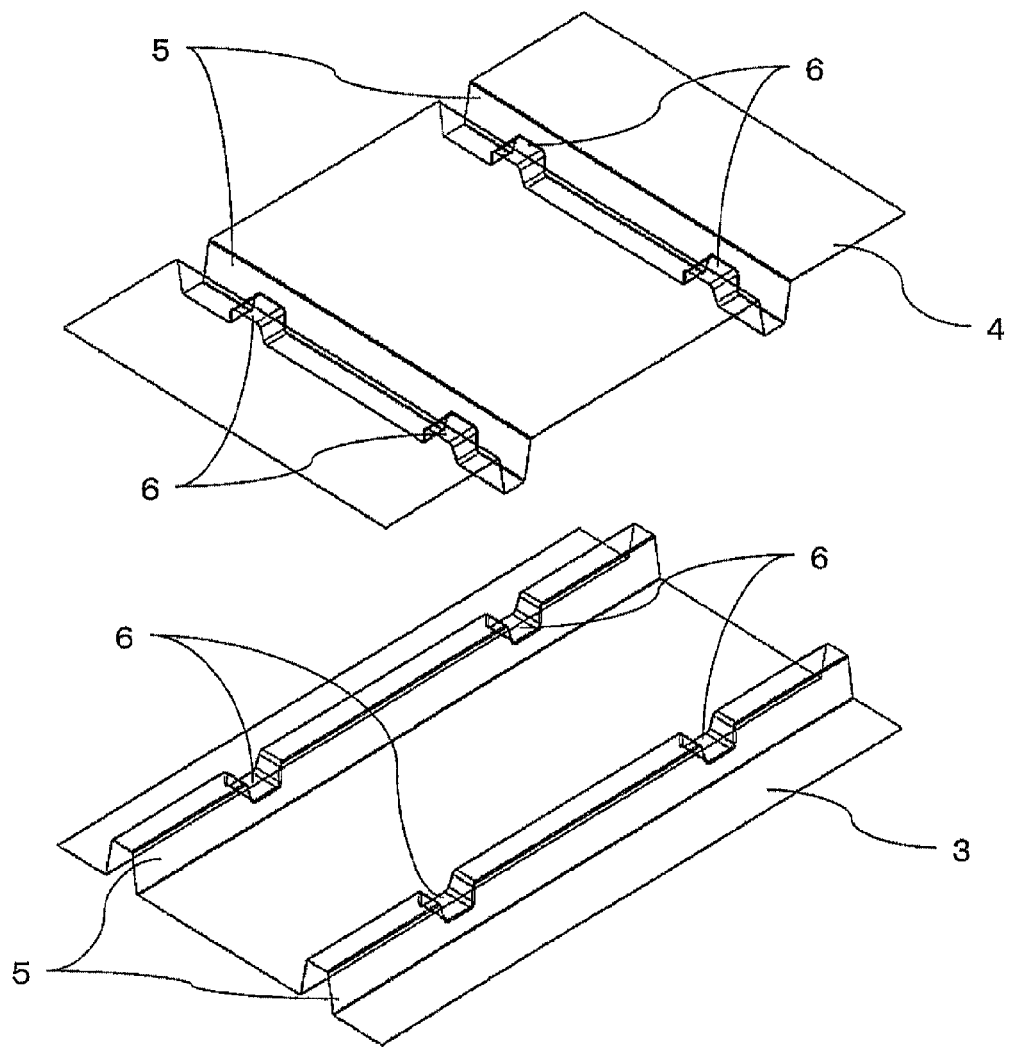
FIG. 5 is a schematic diagram illustrating panels including reinforcing structures of hat-shaped cross-sectional shapes.
Figure 6:
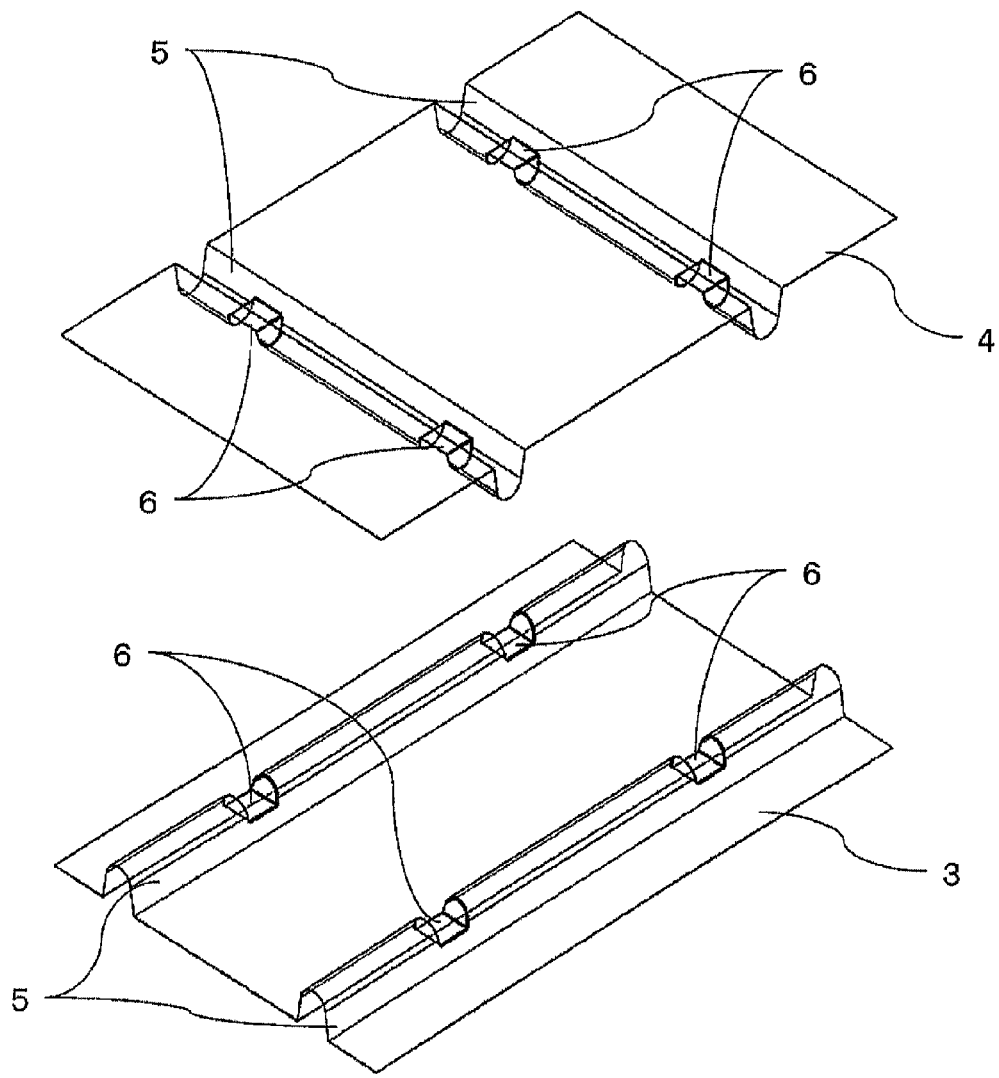
FIG. 6 is a schematic diagram illustrating panels including reinforcing structures of U-shaped cross-sectional shapes.
Figure 7:
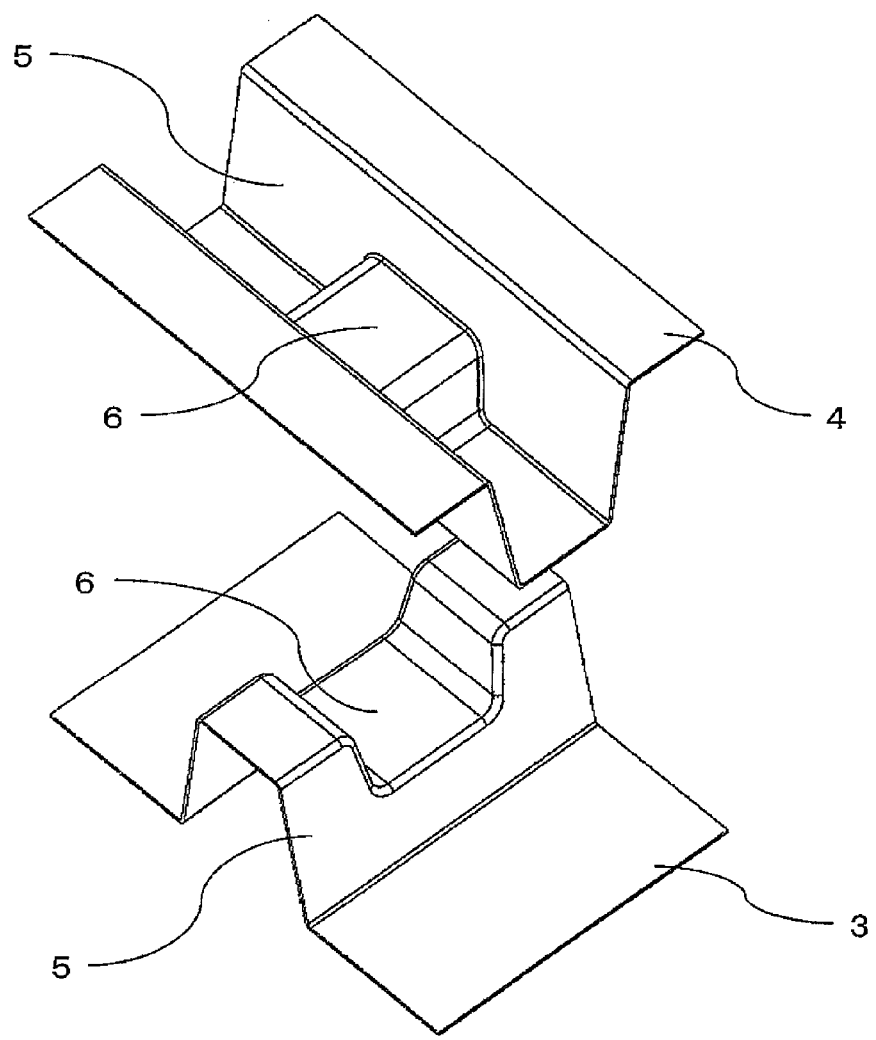
FIG. 7 is an enlarged diagram illustrating recesses in reinforcing structures.
Figure 8:
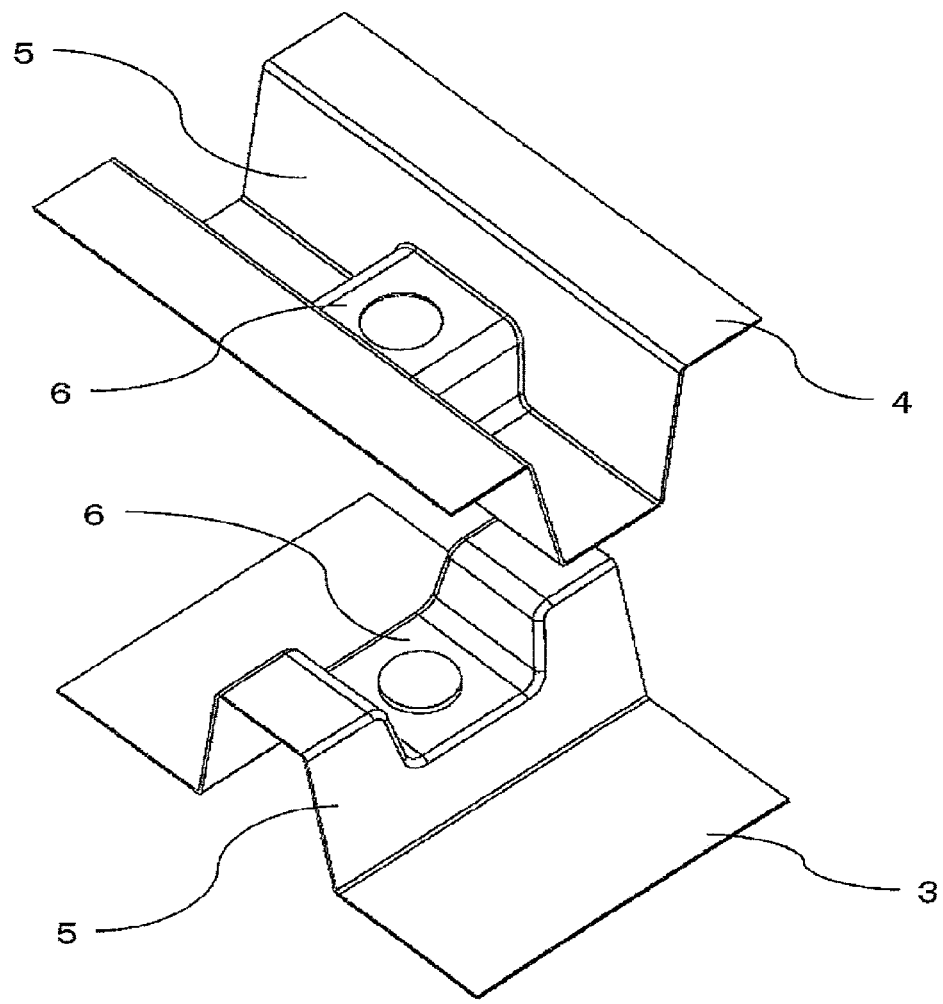
FIG. 8 is an enlarged diagram illustrating recesses in reinforcing structures including convex portions and hole portions.
Figure 9:
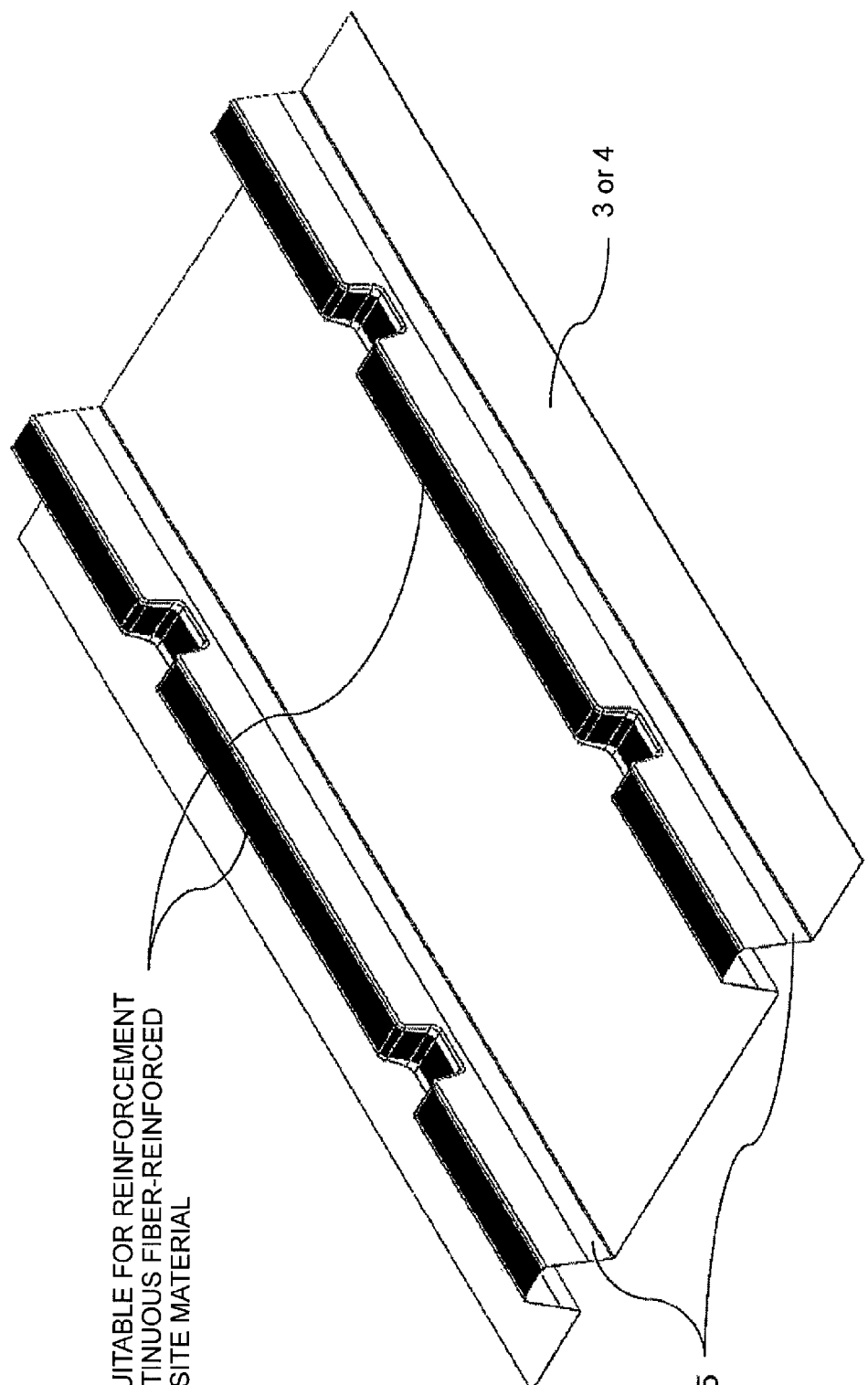
FIG. 9 is a schematic diagram illustrating an example of an area which is capable of reinforcing by a continuous fiber-reinforced composite material.
Figure 10:
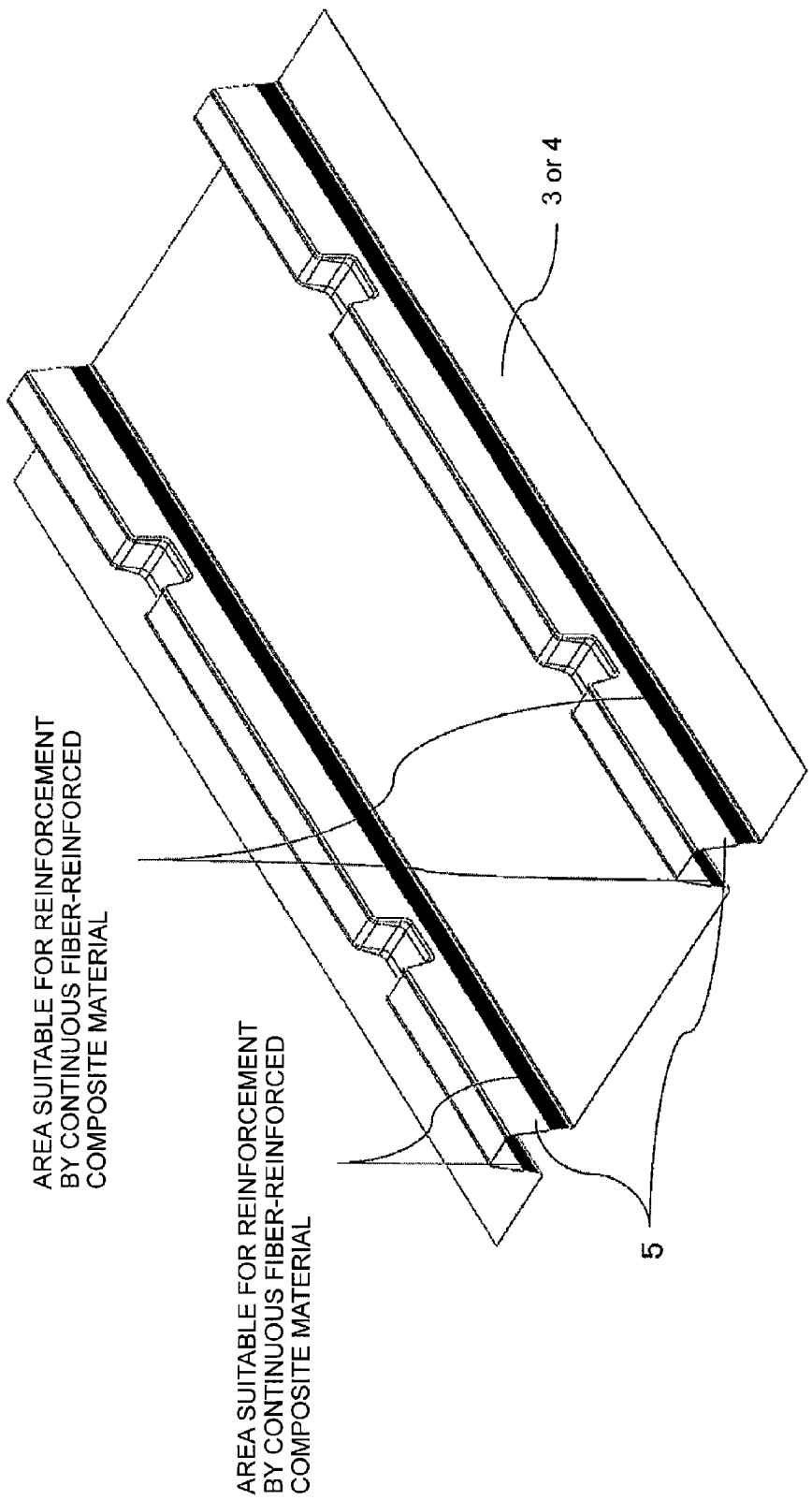
FIG. 10 is a schematic diagram illustrating another example of an area which is capable of reinforcing by a continuous fiber-reinforced composite material.
Figure 11:
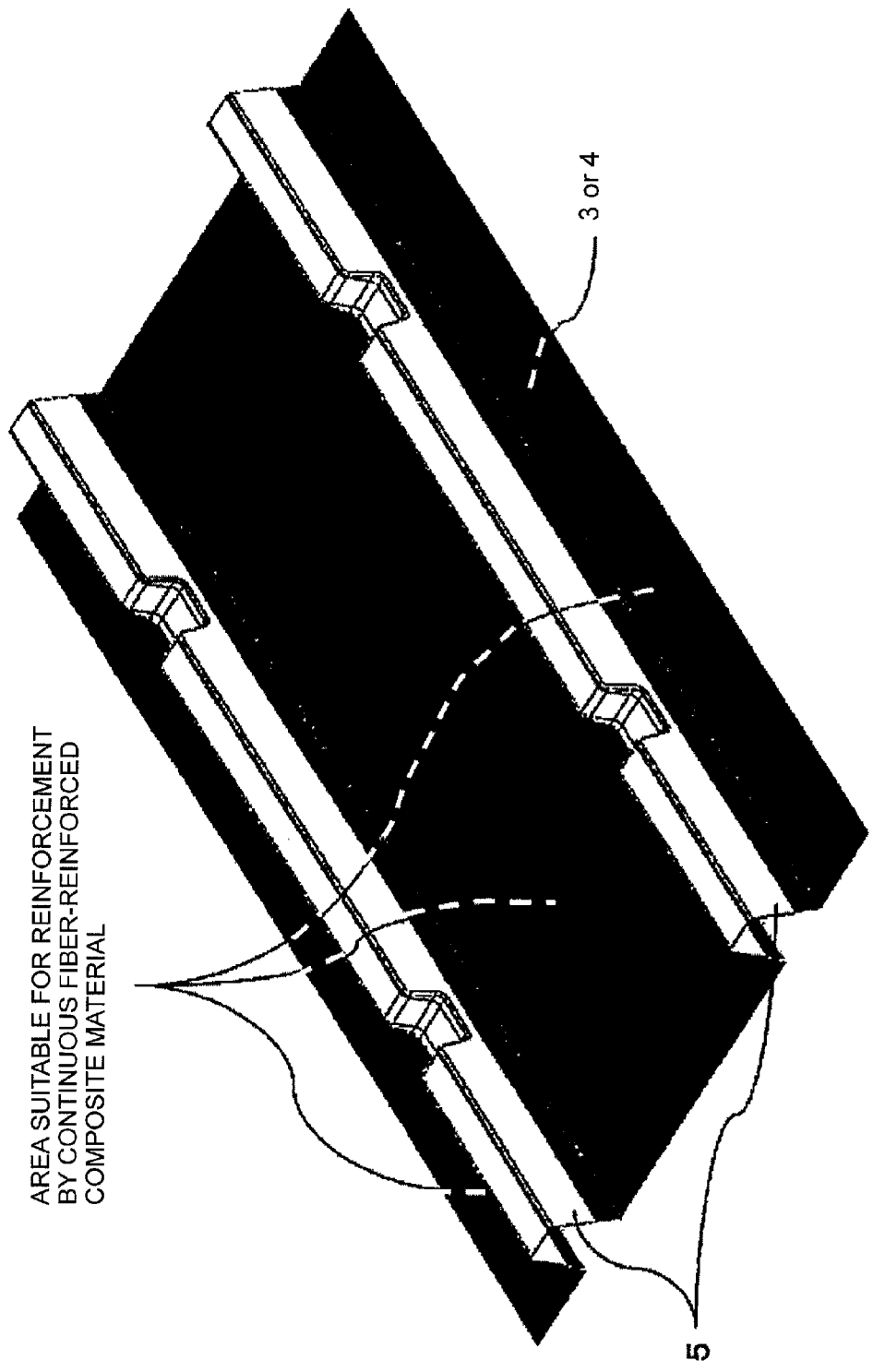
FIG. 11 is a schematic diagram illustrating still another example of an area which is capable of reinforcing by continuous fiber-reinforced composite materials.
Figure 12:
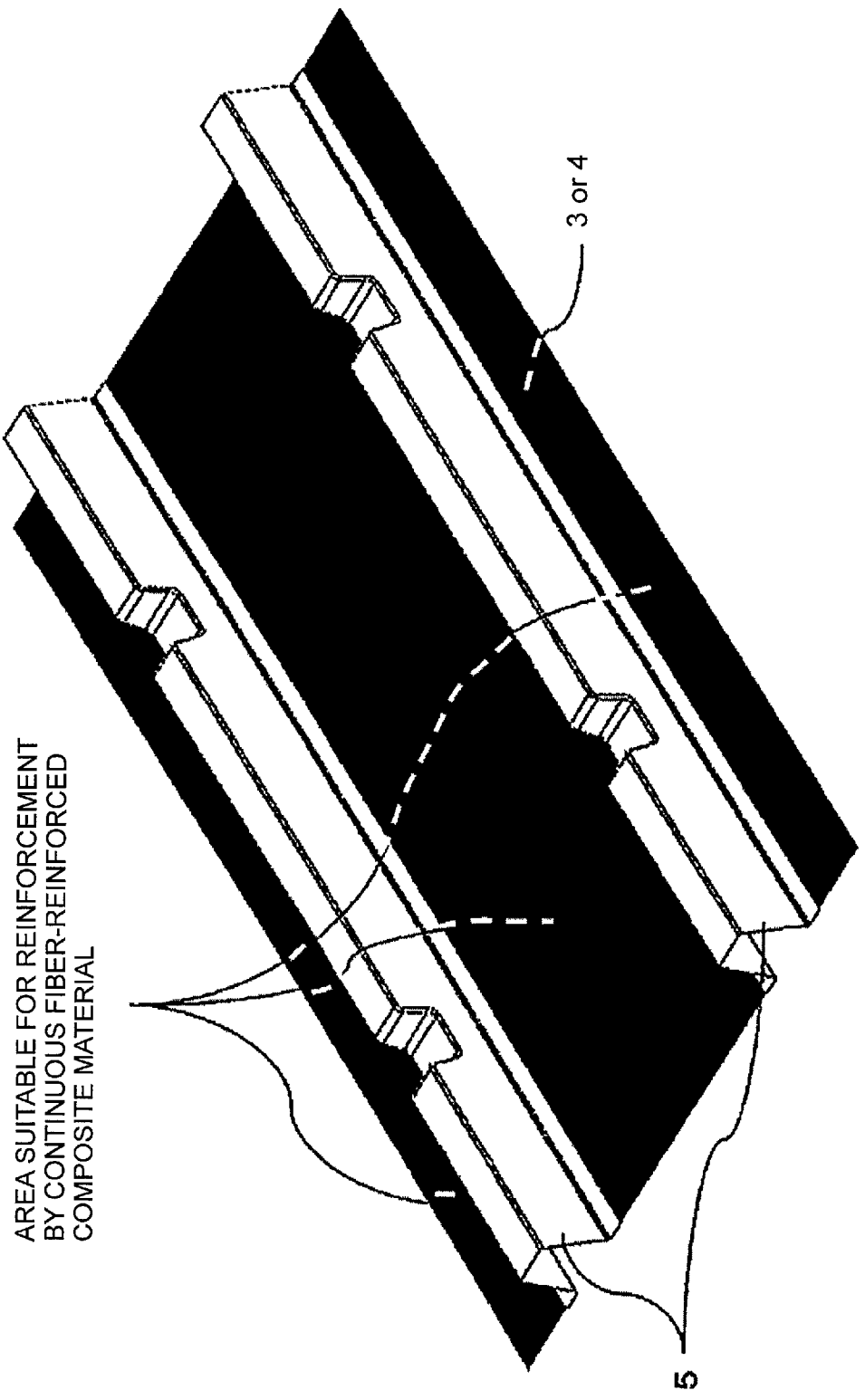
FIG. 12 is a schematic diagram illustrating still further another example of an area which is capable of reinforcing by a continuous fiber-reinforced composite material.
Figure 13:
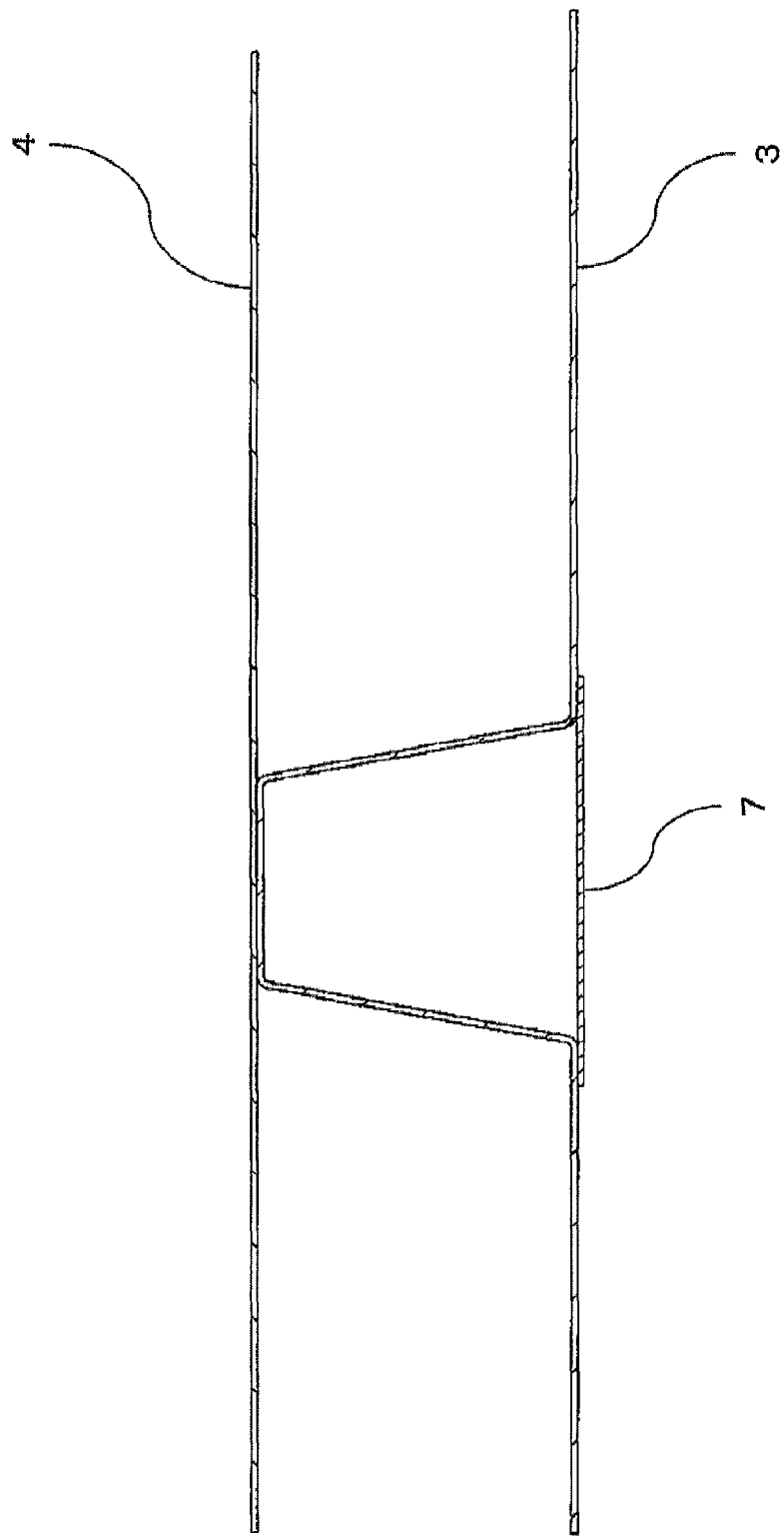
FIG. 13 is an enlarged diagram illustrating a reinforcing structure which includes a hollow closed cross section by a local reinforcing member of a flat cross-sectional shape.
Figure 14:
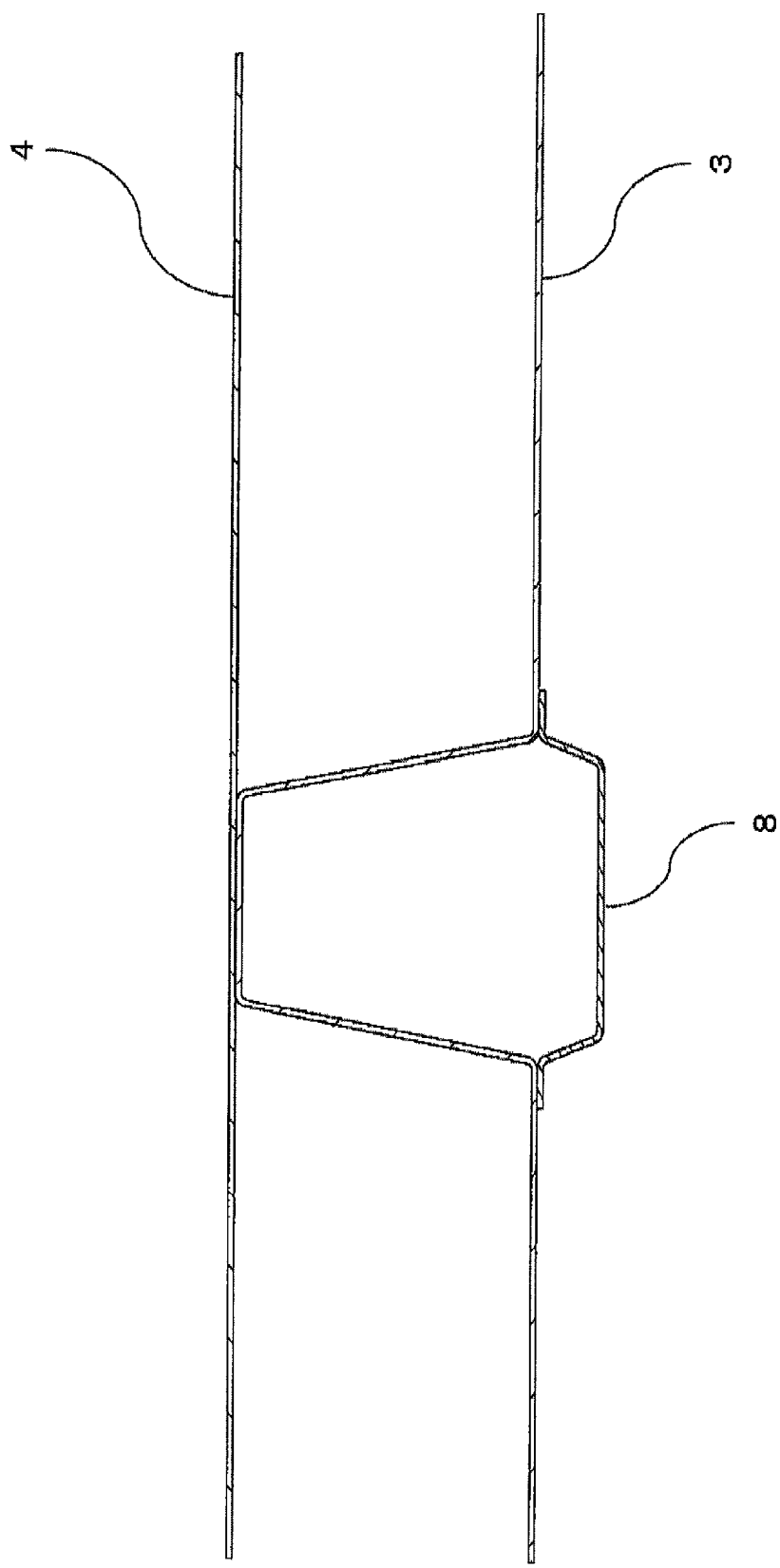
FIG. 14 is an enlarged diagram illustrating a reinforcing structure which includes a hollow closed cross section by a local reinforcing member of a hat cross-sectional shape.
Figure 15:
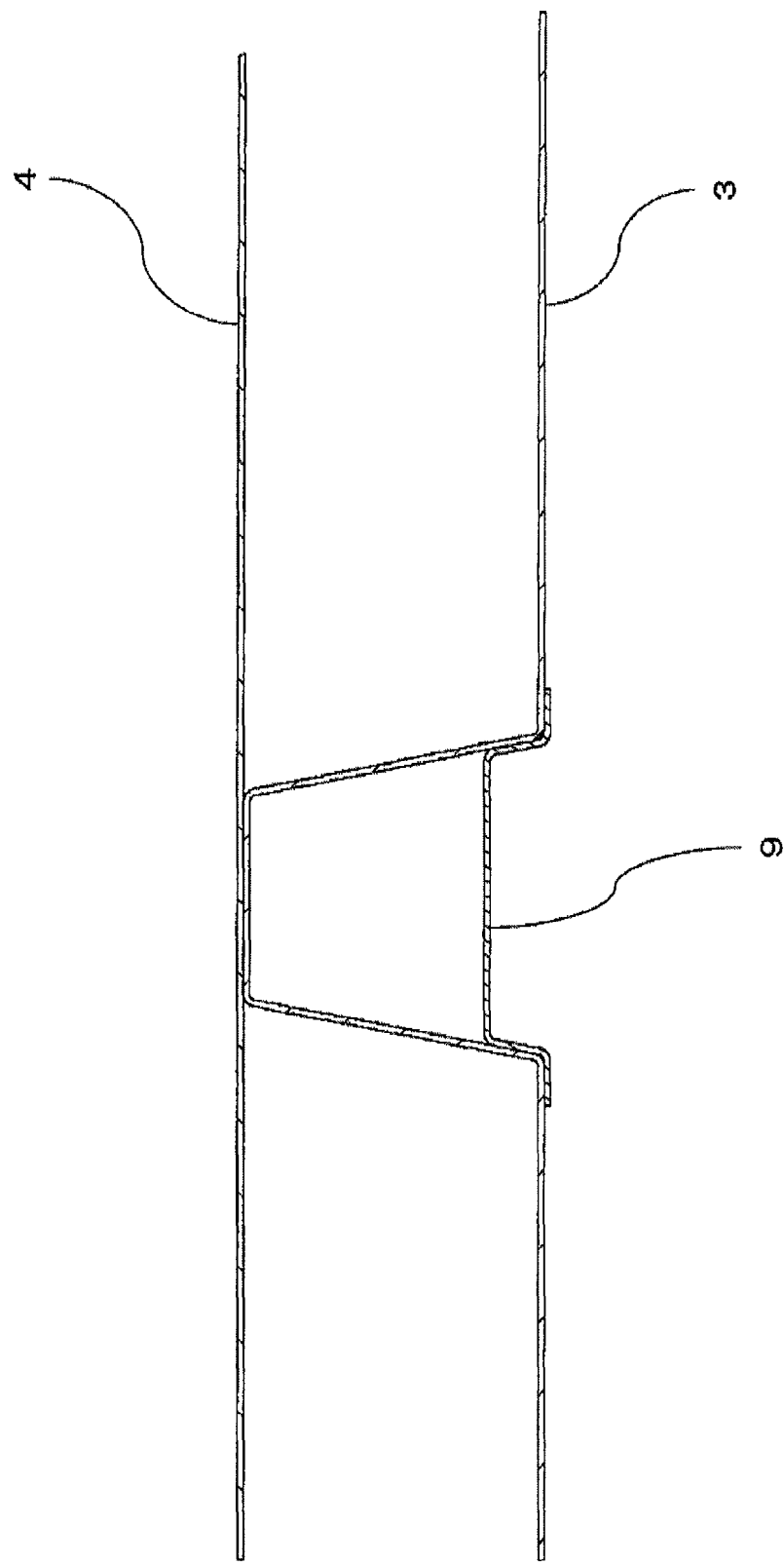
FIG. 15 is an enlarge diagram illustrating a reinforcing structure which includes a hollow closed cross section by a local reinforcing member of a cross-sectional shape in contact with an inside of the reinforcing structure.

It is important to provide recesses in at least two places of the reinforcing structure. The number and the position of the recesses are decided depending on a position and the number of reinforcing structures provided in the panel of the counterpart. As the shape of the recesses, it is preferable that an upper end of the convex open cross-sectional shape of the reinforcing structure include is recessed in a plane (for example, 6 in FIG. 5). The depth of the recesses is preferably more than or equal to 20% and less than or equal to 80% of the height of the reinforcing structure, and further preferably more than or equal to 40% and less than or equal to 60% of the height of the reinforcing structure. It is preferable that a part which includes the recesses is continuously connected to a part which does not include the recesses by a taper or the like. The heights of the recesses provided in the respective panels may be the same, or may be different from each other, but it is important that it is possible to fit the recesses of respective panels when the double deck structure is formed from two sheets of the panels. In addition, the recesses are not necessary to be completely flat and the recesses may have a protrusion portion, a dent portion or a hole portion which plays a supporting role when two sheets of the panels are combined with each other. A rib may be used in order to join two sheets of the panels by a vibration welding or an ultrasonic welding.

The direction of the reinforcing structure of the panel is optional. However, it is preferable that a reinforcing structure which is provided in one of the panels is parallel to a vehicle axis, and a reinforcing structure which is provided in the other of the panels is vertical to the vehicle axis. When a large load by an impact is input from front, rear, left and right sides of the vehicle, it is possible to protect passengers effectively by placing reinforcing structures in the directions describe above. In this case, an angle formed by the reinforcing structure and the vehicle axis may not be completely parallel or not be vertical. However, it is preferable to be within plus or minus 20 degrees, and it is more preferable to be within plus or minus 10 degrees.

The type of a fiber-reinforced thermoplastic composite material constituting two sheets of the panels are not limited in particular, but it is preferable that a random fiber-reinforced composite material in which chopped fibers are randomly oriented in a thermoplastic resin are used, from the viewpoint of moldability and development of properties. It is possible to form the panels from a sheet such as a woven fabric, a sheet in which strands are oriented in one direction, or a multi-axis woven fabric, which are formed from continuous fibers. However, it is concerned in such case that properties are locally dropped since fiber orientation is confused around the recesses described above and thus a break or a wrinkle occurs. It is also possible that a part of the panels which are formed from a random fiber-reinforced composite material is reinforced by a continuous fiber-reinforced composite material in which continuous fibers are uniformly arranged in one direction in a thermoplastic resin. In this case, it is preferable that the most suitable part is selected from a plane or a plane having primary curvature, as shown in FIG. 9 to FIG. 12, and the selected part is reinforced, since the part can be reinforced without disturbing the orientation of the continuous fibers. The plane described above means a face which has a high flatness and may include a rib or a bead of the degree not to disturb the fiber orientation remarkably. The fiber direction of the continuous fiber-reinforced composite material is optional, but it is preferable to arrange it in the longitudinal direction of the reinforcing structure of the panel from a viewpoint of a strength of the floor structure. The fiber-reinforced thermoplastic composite materials constituting two sheets of the panels may be the same, or may be different and a type of a matrix resin, a type of the reinforcing fiber, a form, and an abundance ratio can be appropriately selected depending on an object.

Additionally, it is preferable that the random orientation in the random fiber-reinforced composite material described above is a two-dimensional random orientation. Here, the two-dimensional random orientation means a state in which chopped fibers are two-dimensionally crossed and deposited to from a pseudo-plane and each of the chopped fibers are oriented in the pseudo-plane. In a plate-shaped sample of the random fiber-reinforced composite material in which chopped fibers are two-dimensionally randomly oriented, and when tensile modulus of the sample are measured in two directions orthogonal to each other in the plane, the ratio in which the large value is divided by the small value in the values of the obtained tensile modulus becomes less than or equal to 2.

When two sheets of the panels are formed from random fiber-reinforced composite materials in which chopped fibers are two-dimensionally randomly oriented in a thermoplastic resin, in other words, the random fiber-reinforced composite material such as the above, in the vehicle floor structure according to the invention, it is suitable for fitting and joining in particularly, and the properties become excellent and the utility becomes effectively high.

A cross-sectional shape of the reinforcing structure may be a hollow closed cross-sectional shape by joining a local reinforcing member to at least one reinforcing structure in the reinforcing structures of the panels. In this case, the cross-sectional shape of the local reinforcing member is optional, but it is preferable to be a flat shape, a hat shape or a shape in contact with an inside of the reinforcing structure of the panel. It is preferable that the local reinforcing member is formed from the random fiber-reinforced composite material similarly to the panels and it is more preferable that the local reinforcing member is formed from a two dimensional random fiber-reinforced composite material, and furthermore a part thereof can be reinforced by a continuous fiber-reinforced composite material in which continuous fibers are uniformly arranged in one direction in a thermoplastic resin. In this case, the fiber direction of the continuous fiber-reinforced composite material is optional, but it is preferable to arrange it in the longitudinal direction of the reinforcing structure of the panel from the viewpoint of the strength of the floor structure.

[Method for Joining Panel]

Two sheets of the panels are joined in a state in which recesses of the respective panels are fitted with each other. The method for joining the panels may be selected from adhesion, welding, mechanical fastening and the like. A vibration welding, a hot plate welding, or a solvent welding is preferably used as the welding method. A bolt connection or a rivet connection is preferably used as the mechanical fastening method.

[Method for Joining Local Reinforcing Member]

The method for joining the local reinforcing member described above may be also selected from adhesion, welding, mechanical fastening and the like. A vibration welding, a hot plate welding, or a solvent welding is preferably used as the welding method. A bolt connection or a rivet connection is preferably used as the mechanical fastening method.

[Filed to Which the Invention Can Be Applied]

The vehicle floor structure according to the invention can be suitably applied to a vehicle of any form. Furthermore, the vehicle floor structure can be suitably used in an electric vehicle which does not need a space for housing a fuel pipe or an exhaust pipe. Additionally, it is also possible to house the battery in a space formed by two sheets of the panels, and it is possible to expand an interior space of the vehicle and achieve the lower center of gravity of the vehicle. In this case, it is also possible to provide an opening for maintenance on a part of two sheets of the panels.

REFERENCE SIGNS LIST

1: Floor Structure
2: Side Member
3: Panel (A)
4: Panel (B)
5: Reinforcing Structure
6: Recess
7: Local Reinforcing member (Flat Cross-sectional Shape)
8: Local Reinforcing member (Hat Cross-sectional Shape)
9: Local Reinforcing member (Cross-sectional Shape in Contact with Inside of Reinforcing Structure)
10: Battery
11: Opening for Maintenance
12: Cover of Opening for Maintenance

What is claimed is:

1. A vehicle floor structure, wherein a main structure of the vehicle floor structure is a double deck structure including two sheets of panels formed from a fiber-reinforced thermoplastic composite material,
    wherein, in a region including the double deck structure, each of the panels includes at least two continuous reinforcing structures having a convex open cross-sectional shape,
    recesses are provided in at least two places of the reinforcing structures, and
    the panels are joined in such a manner that the reinforcing structures of the respective panels intersect with each other, and that the recesses provided in the reinforcing structures of the respective panels are fitted to each other.

2. The vehicle floor structure according to claim 1, wherein the reinforcing structures of one of the panels are parallel to a vehicle axis and the reinforcing structures of the other of the panels are vertical to the vehicle axis.

3. The vehicle floor structure according to claim 1, wherein the convex open cross-sectional shape is a hat shape.

4. The vehicle floor structure according to claim 1, wherein a local reinforcing member is joined to at least one reinforcing structure of the reinforcing structures so that a cross-sectional shape of the at least one reinforcing structure is a hollow closed cross-sectional shape.

5. The vehicle floor structure according to claim 1, wherein the fiber-reinforced thermoplastic composite material constituting the panels is a random fiber-reinforced composite material in which chopped fibers are randomly oriented in a thermoplastic resin.

6. The vehicle floor structure according to claim 5, wherein a part of the panels is reinforced by a continuous fiber-reinforced composite material in which continuous fibers are uniformly arranged in one direction in a thermoplastic resin.

7. The vehicle floor structure according to claim 4, wherein the local reinforcing member is constituted by a random fiber-reinforced composite material in which chopped fibers are randomly oriented in a thermoplastic resin.

8. The vehicle floor structure according to claim 7, wherein a part of the local reinforcing member is reinforced by a continuous fiber-reinforced composite material in which continuous fibers are uniformly arranged in one direction in a thermoplastic resin.

9. The vehicle floor structure according to claim 1, wherein the fiber-reinforced thermoplastic composite material includes a carbon fiber as reinforcing fiber.

10. The vehicle floor structure according to claim 1, further comprising a battery housed in a space which is formed by two sheets of the panels.

11. An electric vehicle comprising a vehicle floor structure according to claim 10.

\* \* \* \* \*